(12) United States Patent
Kawahara et al.

(10) Patent No.: US 7,803,888 B2
(45) Date of Patent: Sep. 28, 2010

(54) OLEFIN-BASED POLYMERS AND USES THEREOF

(75) Inventors: Nobuo Kawahara, Sodegaura (JP); Shinichi Kojoh, Ichihara (JP); Shingo Matsuo, Chiba (JP); Hideyuki Kaneko, Ichihara (JP); Tomoaki Matsugi, Ichihara (JP); Norio Kashiwa, Minato-ku (JP); Munehito Funaya, Ichihara (JP); Naritoshi Hirota, Ichihara (JP); Tooru Tanaka, Ichihara (JP); Toshiyuki Hirose, Ichihara (JP); Nobuhisa Mikawa, Chiba (JP); Kouichi Kizu, Ichihara (JP); Keiji Okada, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 813 days.

(21) Appl. No.: 11/628,640

(22) PCT Filed: Jun. 9, 2005

(86) PCT No.: PCT/JP2005/010575

§ 371 (c)(1), (2), (4) Date: Dec. 6, 2006

(87) PCT Pub. No.: WO2005/121192

PCT Pub. Date: Dec. 22, 2005

(65) Prior Publication Data

US 2007/0249792 A1    Oct. 25, 2007

(30) Foreign Application Priority Data

Jun. 10, 2004 (JP) .............................. 2004-172717
Nov. 9, 2004 (JP) .............................. 2004-325057

(51) Int. Cl.
C08F 4/72 (2006.01)

(52) U.S. Cl. ..................................................... 526/170
(58) Field of Classification Search .................. 526/170
See application file for complete search history.

(56) References Cited

U.S. PATENT DOCUMENTS 6,255,425 B1 *   7/2001   Asanuma et al. ............ 526/348

FOREIGN PATENT DOCUMENTS

| EP | 0317240 A1 | 5/1989 |
|---|---|---|
| JP | 61-113604 A | 5/1986 |
| JP | 03-200810 A | 9/1991 |
| JP | 05-209013 A | 8/1993 |
| WO | WO 01/27124 A1 | 4/2001 |
| WO | WO 02/04468 A1 | 1/2002 |

* cited by examiner

*Primary Examiner*—Ling-Siu Choi
*Assistant Examiner*—Sonya Wright
(74) *Attorney, Agent, or Firm*—Buchanan Ingersoll & Rooney PC

(57) ABSTRACT

A novel olefin-based polymer has excellent thermal resistance, as well as excellent balance among various properties. The olefin-based polymer is an olefin-based polymer comprising 50 to 100% by weight of a constituent unit derived from 4-methyl-1-pentene, and 0 to 50% by weight of a constituent unit derived from at least one olefin selected from olefins having 2 to 20 carbon atoms except 4-methyl-1-pentene, and having the following properties: i) the diad isotacticity is 70% or greater, ii) the ratio (Mw/Mn) of the weight average molecular weight (Mw) to the number average molecular weight (Mn) as measured by gel permeation chromatography (GPC) is in the range of 1.0 to 3.5, and iii) the intrinsic viscosity [η] is 0.5 (dl/g) or greater.

14 Claims, No Drawings

OLEFIN-BASED POLYMERS AND USES THEREOF

TECHNICAL FIELD

The present invention relates to olefin-based polymers, and in particular, to novel 4-methyl-1-pentene-based (co)polymers having narrow molecular weight distributions and large molecular weights. The invention also relates to uses of these novel 4-methyl-1-pentene-based (co)polymers.

BACKGROUND ART

Olefin-based polymers are excellent in processability, chemical resistance, electrical properties, mechanical properties and the like, and thus, they are processed into extrusion molded articles, injection molded articles, blow molded articles, films, sheets and the like, to be provided for a wide variety of applications such as daily goods, kitchenware, packaging films, woven/non-woven fabrics, electric appliances, mechanical parts, electric parts, automobile parts and the like. In particular, olefin-based polymers containing 4-methyl-1-pentene are resins having excellent transparency, gas permeability and chemical resistance, as well as excellent thermal resistance, and thus, the polymers are widely used for medical instruments, thermally resistant wire coating, thermal resistant tableware and the like.

These olefin-based polymers are in general prepared using catalysts comprising transition metal compounds and organic aluminum compounds, that is, so-called Ziegler type catalysts. However, because the constitution of the polymers, such as molecular weight, is not uniformly obtained, the mechanical properties such as toughness and the like, and the strength of the polymers are deteriorated, and it has been requested to improve such properties in order for the olefin-based polymers to be used as products.

Meanwhile, those olefin-based polymers obtained using organometallic complex catalysts containing cyclopentadienyl groups, are in general characterized in that the constitution of the polymers, including molecular weight and the like, is uniform. However, it has been pointed out that the polymers are deteriorated in thermal resistance, compared with the conventional olefin-based polymers obtained with Ziegler type catalysts. As a possible cause for such deterioration, it is said that the olefin-based polymers prepared using conventional metallocene catalysts contain heterogeneous bonding between the monomer units to an extent of a few percent, and this adversely affects the polymer properties. Therefore, if olefin-based polymers having high thermal resistance as well as excellent processability and excellent impact resistance, thermal resistance, appearance, rigidity and tensile breaking elongation could be prepared, the industrial value thereof would be extremely great, and development of such olefin-based polymers is strongly demanded.

On the other hand, olefin-based elastomers, another family of olefin-based polymers, provide a material having excellent shock absorbability, heat sealability and the like, and thus are used individually, and also as a modifying agent for the aforementioned olefin-based polymers.

However, the conventional olefin-based elastomers not always have satisfactory thermal properties such as thermal resistance. Also, there has been a problem that their small molecular weights make the properties unsatisfactory. For this reason, if a novel olefin-based polymer having excellent thermal resistance as well as being excellently balanced in various properties as a result of increasing the molecular weight, could be prepared, the industrial value thereof would be extremely great, and development of such olefin-based polymers is strongly demanded.

DISCLOSURE OF THE INVENTION

Problem to be Solved by the Invention

Under such circumstances in the related art, it is an object of the present invention to provide novel olefin-based polymers which have excellent thermal resistance as well as having high molecular weights and narrow molecular weight distributions, and are excellently balanced in various properties, by preparing 4-methyl-1-pentene-based resins having specific properties.

Means to Solve the Problem

According to the present invention, olefin-based polymers and uses thereof as described below are provided to solve the problem of the invention.

(1) A 4-methyl-1-pentene-based polymer comprising 50 to 100% by weight of a constituent unit derived from 4-methyl-1-pentene, and 0 to 50% by weight of a constituent unit derived from at least one olefin selected from olefins having 2 to 20 carbon atoms except 4-methyl-1-pentene, and having the following properties:

(i) the diad isotacticity is 70% or greater;
(ii) the ratio (Mw/Mn) of the weight average molecular weight (MW) to the number average molecular weight (Mn) as measured by gel permeation chromatography (GPC) is in the range of 1.0 to 3.5; and
(iii) the intrinsic viscosity [η] is 0.5 (dl/g) or greater.

(2) A 4-methyl-1-pentene-based copolymer comprising 50 to 99.9% by weight of a constituent unit derived from 4-methyl-1-pentene, and 0.1 to 50% by weight of a constituent unit derived from at least one olefin selected from olefins having 2 to 20 carbon atoms except 4-methyl-1-pentene, and having the following properties:

(i) the diad isotacticity is 70% or greater;
(ii) the ratio (Mw/Mn) of the weight average molecular weight (MW) to the number average molecular weight (Mn) as measured by gel permeation chromatography (GPC) is in the range of 1.0 to 3.5; and
(iii) the intrinsic viscosity [η] is 0.5 (dl/g) or greater.

(3) An olefin-based polymer A comprising 90 to 100% by weight of a constituent unit derived from 4-methyl-1-pentene, and 0 to 10% by weight of a constituent unit derived from at least one olefin selected from olefins having 2 to 20 carbon atoms except 4-methyl-1-pentene, and having the following properties:

(i) the melting point (Tm) measured by DSC is 220° C. or higher;
(ii) the ratio (Mw/Mn) of the weight average molecular weight (MW) to the number average molecular weight (Mn) as measured by gel permeation chromatography (GPC) is in the range of 1.0 to 3.5; and (iii) the proportion of the decane-soluble fraction is 1% by weight or less.

(4) An olefin-based polymer B comprising 50 to 99% by weight of a constituent unit derived from 4-methyl-1-pentene, and 1 to 50% by weight of a constituent unit derived from at least one olefin selected from olefins having 2 to 20 carbon atoms except 4-methyl-1-pentene, and having the following properties:

(i) the melting point (Tm) measured by DSC is below 220° C. or unrecognizable;

(ii) the ratio (Mw/Mn) of the weight average molecular weight (MW) to the number average molecular weight (Mn) as measured by gel permeation chromatography (GPC) is in the range of 1.0 to 3.5; and (iii) the intrinsic viscosity [η] is 1.0 (dl/g) or greater.

(5) A 4-methyl-1-pentene homopolymer having the following properties:

(i) the diad isotacticity is 70% or greater;

(ii) the melting point (Tm) measured by DSC is 230° C. or higher;

(iii) the ratio (Mw/Mn) of the weight average molecular weight (MW) to the number average molecular weight (Mn) as measured by gel permeation chromatography (GPC) is in the range of 1.0 to 3.5; and (iv) the intrinsic viscosity [η] is 0.5 (dl/g) or greater.

(6) A 4-methyl-1-pentene-based elastomer comprising 50 to 90% by weight of a constituent unit derived from 4-methyl-1-pentene, and 10 to 50% by weight of a constituent unit derived from at least one olefin selected from olefins having 2 to 20 carbon atoms except 4-methyl-1-pentene, and having the following properties:

(i) the diad isotacticity is 70% or greater;

(ii) the ratio (Mw/Mn) of the weight average molecular weight (MW) to the number average molecular weight (Mn) as measured by gel permeation chromatography (GPC) is in the range of 1.0 to 3.5; and (iii) the intrinsic viscosity [η] is 0.5 (dl/g) or greater.

(7) The polymer or elastomer according to any one of (1) to (6) above, wherein the polymer or elastomer is prepared using a metallocene catalyst represented by the following Formula (1) or (2):

[Chemical Formula 1]

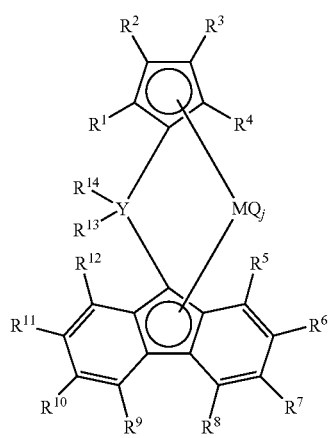

(1)

[Chemical Formula 2]

-continued

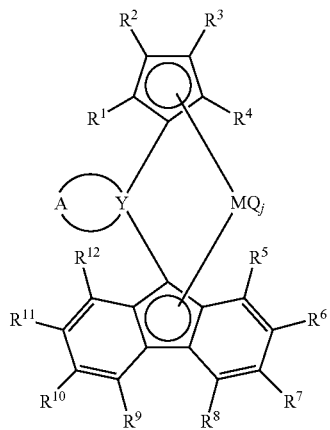

(2)

wherein $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$, which may be identical or different, are each selected from hydrogen, a hydrocarbon group, and a silicon-containing hydrocarbon group; the neighboring substituents from $R^1$ to $R^4$ may be bound to each other to form a ring, while the neighboring substituents from $R^5$ to $R^{12}$ may be bound to each other to form ring; A is a divalent hydrocarbon group having 2 to 20 carbon atoms, which may contain some unsaturated bonds and/or aromatic rings, and A may contain two or more cyclic structures including a ring formed by A together with Y; M is a metal selected from Group 4 of the Periodic Table of Elements; Y is carbon or silicon; Q is selected from a halogen atom, a hydrocarbon group, an anionic ligand, and a neutral ligand capable of coordination by an electron lone pair and may be of identical or different combinations; and j is an integer from 1 to 4.

(8) An injection molded article comprising the polymer or elastomer according to any one of (1) to (7) above.

(9) A film or sheet comprising the polymer or elastomer according to any one of (1) to (7) above.

(10) A fiber comprising the polymer or elastomer according to any one of (1) to (7) above.

(11) A blow molded vessel comprising the polymer or elastomer according to any one of (1) to (7) above.

(12) A release film comprising the polymer or elastomer according to any one of (1) to (7) above.

(13) A non-woven fabric comprising the olefin-based polymer or elastomer according to any one of (1) to (7) above.

(14) A damping material comprising the olefin-based polymer or elastomer according to any one of (1) to (7) above.

In addition, as used in the present specification, the 4-methyl-1-pentene-based polymer, the 4-methyl-1-pentene-based copolymer, the olefin-based polymer A, the olefin-based polymer B, the 4-methyl-1-pentene homopolymer and the 4-methyl-1-pentene-based elastomer may be generically referred to as olefin-based polymers.

Effect of the Invention

The olefin-based polymers according to the present invention are excellent in thermal resistance, various mechanical properties and the like. The molded articles according to the invention are excellent in thermal resistance, various mechanical properties and the like.

BEST MODE FOR CARRYING OUT THE INVENTION

Hereinafter, the olefin-based polymers according to the present invention will be described in detail. 4-Methyl-1-pentene-based polymer The 4-methyl-1-pentene-based polymer according to the invention is an olefin-based polymer comprising 50 to 100% by weight, preferably 55 to 100% by weight, of a constituent unit derived from 4-methyl-1-pentene, and 0 to 50% by weight, preferably 0 to 45% by weight, of a constituent unit derived from at least one olefin selected from olefins having 2 to 20 carbon atoms except 4-methyl-1-pentene. Hereinafter, it is construed that the term "olefins having 2 to 20 carbon atoms" does not include 4-methyl-1-pentene, unless stated otherwise.

The 4-methyl-1-pentene-based polymer according to the invention is such that: (i) the diad isotacticity is 70% or greater, preferably 80% or greater, more preferably 90% or greater, and even more preferably 95% or greater. When the diad isotacticity is within the range, good thermal resistance and rigidity can be obtained, which is preferable.

The 4-methyl-1-pentene-based polymer according to the invention is such that: (ii) the ratio (Mw/Mn) of the weight average molecular weight (Mw) to the number average molecular weight (Mn) as measured by gel permeation chromatography (GPC) is in the range of 1.0 to 3.5, preferably 1.0 to 3.0, more preferably 1.0 to 2.8, and even more preferably 1.5 to 2.8.

When the value of Mw/Mn is large, it is disadvantageous for the polymer to manifest its mechanical properties such as toughness and the like. When the value of Mw/Mn is within the range of 1.0 to 3.5, it is advantageous for the polymer to manifest its mechanical properties such as toughness and the like, and it is industrially valuable.

The 4-methyl-1-pentene-based polymer according to the invention is such that: (iii) the intrinsic viscosity [η] is 0.5 (dl/g) or greater, preferably 1.0 to 20 (dl/g), and more preferably 1.2 to 10 (dl/g).

The 4-methyl-1-pentene-based polymer according to the invention has a molecular weight such as that the weight average molecular weight (Mw) determined by gel permeation chromatography (GPC) is, as calculated in terms of polystyrene, preferably 1,000 to 10,000,000, and more preferably 1,500 to 5,000,000.

The 4-methyl-1-pentene-based polymer according to the invention is such that when the content of the constituent unit derived from an olefin having 2 to 20 carbon atoms in the polymer is 0 to 20% by mole, preferably 0 to 10% by mole, if the melting point (Tm) measured by DSC and the content (% by mole) of the constituent unit derived from an olefin having 2 to 20 carbon atoms in the polymer satisfy the following relational expression, the randomness in the monomer sequence distribution of the polymer is good, thus the composition is uniform, and the fraction of decane-soluble components is favorably small:

$$Tm \leq 240 - 3.0M$$

wherein M represents the content (% by mole) of the olefin having 2 to 20 carbon atoms.

The olefin having 2 to 20 carbon atoms that is used for the 4-methyl-1-pentene-based polymer according to the invention, may be exemplified by a straight-chained or branched α-olefin, a cyclic olefin, an aromatic vinyl compound, a conjugated diene, a non-conjugated polyene, a functionalized vinyl compound, or the like.

Specific examples of the straight-chained or branched α-olefin used for the 4-methyl-1-pentene-based polymer according to the invention include straight-chained α-olefins having 2 to 20, preferably 2 to 10, carbon atoms, such as ethylene, propylene, 1-butene, 1-pentene, 1-hexene, 1-octene, 1-decene, 1-dodecene, 1-tetradecene, 1-hexadecene, 1-octadecene, 1-eicosene and the like; and branched α-olefins having 5 to 20, preferably 5 to 10, carbon atoms, such as 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, 3-ethyl-1-hexene and the like.

Examples of the cyclic olefin include those having 3 to 20, preferably 5 to 15, carbon atoms, such as cyclopentene, cycloheptene, norbornene, 5-methyl-2-norbornene, tetracyclododecene, vinylcyclohexane and the like.

Examples of the aromatic vinyl compound include styrene, and mono- or polyalkylstyrene such as α-methylstyrene, o-methylstyrene, m-methylstyrene, p-methylstyrene, o,p-dimethylstyrene, o-ethylstyrene, m-ethylstyrene, p-ethylstyrene and the like.

Examples of the conjugated diene include those having 4 to 20, preferably 4 to 10, carbon atoms, such as 1,3-butadiene, isoprene, chloroprene, 1,3-pentadiene, 2,3-dimethylbutadiene, 4-methyl-1,3-pentadiene, 1,3-pentadiene, 1,3-hexadiene, 1,3-octadiene and the like.

Examples of the non-conjugated polyene include those having 5 to 20, preferably 5 to 10, carbon atoms, such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, 2-propenyl-2,2-norbornadiene and the like.

Examples of the functionalized vinyl compound include hydroxyl group-containing olefins; halogenated olefins; unsaturated carboxylic acids such as acrylic acid, propionic acid, 3-butenoic acid, 4-pentenoic acid, 5-hexenoic acid, 6-heptenoic acid, 7-octenoic acid, 8-nonenoic acid, 9-decenoic acid and the like; unsaturated amines such as allylamine, 5-hexenamine, 6-heptenamine and the like; unsaturated acid anhydrides such as (2,7-octadienyl)succinic anhydride, pentapropenylsuccinic anhydride, and the compounds obtained from the exemplary compounds of the unsaturated carboxylic acids by replacing the carboxylic acid group with a carboxylic acid anhydride group; unsaturated carboxylic acid halides such as the compounds obtained from the exemplary compounds of the unsaturated carboxylic acids by replacing the carboxylic acid group with a carboxylic acid halide group; unsaturated epoxy compounds such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene, 11-epoxy-1-undecene and the like; and the like.

The hydroxyl group-containing olefin is not particularly limited as long as it is a compound based on hydroxyl group-containing olefin, but examples thereof include terminal-hydroxylated olefin compounds. Specific examples of the terminal-hydroxylated olefin compounds include straight-chained hydroxyl-α-olefins having 2 to 20, preferably 2 to 10, carbon atoms, such as vinyl alcohol, allyl alcohol, hydroxyl-1-butene, hydroxyl-1-pentene, hydroxyl-1-hexene, hydroxyl-1-octene, hydroxyl-1-decene, hydroxyl-1-dodecene, hydroxyl-1-tetradecene, hydroxyl-1-hexadecene, hydroxyl-1-octadecene, hydroxyl-1-eicosene and the like; and branched hydroxyl-α-olefins having preferably to 20, more preferably 5 to 10, carbon atoms, such as hydroxyl-3-methyl-1-butene, hydroxyl-4-methyl-1-pentene, hydroxyl-3-methyl-1-pentene, hydroxyl-3-ethyl-1-pentene, hydroxyl-4,4-dimethyl-1-pentene, hydroxyl-4-methyl-1-hexene, hydroxyl-4,4-dimethyl-1-hexene, hydroxyl-4-ethyl-1-hexene, hydroxyl-3-ethyl-1-hexene and the like.

Specific examples of the halogenated olefin include halogenated α-olefins having the atoms from Group 17 of the Periodic Table of Elements, such as chlorine, bromine, iodine and the like, for example, straight-chained halogenated α-olefins having 2 to 20, preferably 2 to 10, carbon atoms, such as vinyl halide, 1-butene halide, 1-pentene halide, 1-hexene halide, 1-octene halide, 1-decene halide, 1-dodecene halide, 1-tetradecene halide, 1-hexadecene halide, 1-octadecene halide, 1-eicosene halide and the like; and branched halogenated α-olefins having preferably 5 to 20, more preferably 5 to 10, carbon atoms, such as 3-methyl-1-butene halide, 4-methyl-1-pentene halide, 3-methyl-1-pentene halide, 3-ethyl-1-pentene halide, 4,4-dimethyl-1-pentene halide, 4-methyl-1-hexene halide, 4,4-dimethyl-1-hexene halide, 4-ethyl-1-hexene halide, 3-ethyl-1-hexene halide and the like.

The olefins that are used together with 4-methyl-1-pentene may be used individually or in combination of two or more species. For the olefins that are used together with 4-methyl-1-pentene, in particular, ethylene, propylene, 1-butene, 1-pentene, 1-hexene, 3-methyl-1-butene, 3-methyl-1-pentene, 3-ethyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, vinylcyclohexane, styrene and the like are suitably used.

The 4-methyl-1-pentene-based polymer according to the invention preferably has a parameter B value, which indicates the randomness in the sequence distribution of the copolymerized monomers, of 1.0 to 1.5, preferably 1.0 to 1.3, and more preferably 1.0 to 1.2.

This parameter B value has been suggested by Coleman et al. (B. D. Coleman and T. G. Fox, J. Polym. Sci., A1, 3183 (1963)), and is defined as follows:

$$B = P_{12}/(2P_1 \cdot P_2)$$

wherein $P_1$ and $P_2$ are respectively the proportional contents of a first monomer and a second monomer, and $P_{12}$ is the proportion of the (first monomer)-(second monomer) sequences among the entire bimolecular sequences. Furthermore, when this B value is 1, the polymer follows the Bernoulli's statistics; when B<1, the copolymer is a block copolymer; and when B>1, the copolymer is an alternating copolymer.

When the parameter B value is within the range described above, the randomness of the monomer sequence distribution in the polymer is good, and thus, the mechanical properties and thermal resistance are excellent and favorable.

4-Methyl-1-pentene-based Copolymer

The 4-methyl-1-pentene-based copolymer according to the invention comprises 50 to 99.9% by weight, preferably 55 to 99.9% by weight, of a constituent unit derived from 4-methyl-1-pentene, and 0.1 to 50% by weight, preferably 0.1 to 45% by weight, of a constituent unit derived from at least one olefin selected from olefins having 2 to 20 carbon atoms.

The 4-methyl-1-pentene-based copolymer according to the invention is such that: (i) the diad isotacticity is 70% or greater, preferably 80% or greater, more preferably 90% or greater, and even more preferably 95% or greater.

When the diad isotacticity is within the aforementioned range, good thermal resistance and rigidity can be obtained, which is favorable.

The 4-methyl-1-pentene-based copolymer according to the invention is such that: (ii) the ratio (Mw/Mn) of the weight average molecular weight (Mw) to the number average molecular weight (Mn) as measured by gel permeation chromatography (GPC) is in the range of 1.0 to 3.5, preferably in the range of 1.0 to 3.0, more preferably 1.0 to 2.8, and even more preferably 1.5 to 2.8.

When the value of Mw/Mn is large, it is disadvantageous for the polymer to manifest its mechanical properties such as toughness and the like. When the value of Mw/Mn is within the range of 1.0 to 3.5, it is advantageous for the polymer to manifest its mechanical properties such as toughness and the like, and it is industrially valuable.

The 4-methyl-1-pentene-based copolymer according to the invention is such that: (iii) the intrinsic viscosity [η] is 0.5 (dl/g) or greater, preferably 1.0 to 20 (dl/g), and more preferably 1.2 to 10 (dl/g).

The 4-methyl-1-pentene-based copolymer according to the invention has a molecular weight such as that the weight average molecular weight (Mw) determined by gel permeation chromatography (GPC) is, as calculated in terms of polystyrene, preferably 1,000 to 10,000,000, and more preferably 1,500 to 5,000,000.

The 4-methyl-1-pentene-based copolymer according to the invention is such that when the content of the constituent unit derived from an olefin having 2 to 20 carbon atoms in the copolymer is 0.1 to 20% by mole, preferably 0.1 to 10% by mole, if the melting point (Tm) measured by DSC and the content (% by mole) of the constituent unit derived from an olefin having 2 to 20 carbon atoms in the polymer satisfy the following relational expression, the randomness in the monomer sequence distribution of the polymer is good, thus the composition is uniform, and the fraction of decane-soluble components is favorably small:

$Tm \leq 240 - 3.0M$; and more preferably, $220 - 7.5M \leq Tm \leq 240 - 3.0M$ wherein M represents the content (% by mole) of the olefin having 2 to 20 carbon atoms).

The olefin having 2 to 20 carbon atoms that is used for the 4-methyl-1-pentene-based copolymer according to the invention, may be exemplified by the same olefins having 2 to 20 carbon atoms that are used for the 4-methyl-1-pentene-based polymer described above.

The 4-methyl-1-pentene-based copolymer according to the invention preferably has a parameter B value, which indicates the randomness in the sequence distribution of the copolymerized monomers, of 0.9 to 1.5, preferably 0.9 to 1.3, and more preferably 0.9 to 1.2.

When the parameter B value is within the aforementioned range, the randomness of the monomer sequence distribution in the polymer is good, and thus, the mechanical properties and thermal resistance are excellent, and thus, it is favorable.

Olefin-based Polymer A

The olefin-based polymer A according to the invention comprises 90 to 100% by weight of a constituent unit derived from 4-methyl-1-pentene, and 0 to 10% by weight of a constituent unit derived from at least one olefin selected from olefins having 2 to 20 carbon atoms. In the olefin-based polymer A according to the invention, the content of the constituent unit derived from 4-methyl-1-pentene in the polymer is preferably 93% by weight or greater, and more preferably 95% by weight or greater.

The olefin-based polymer A according to the invention is such that: (i) the melting point (Tm) measured by DSC is 220° C. or higher, more preferably 225° C. or higher, and even more 230° C. or higher. If the melting point of the olefin-based polymer is high, it is advantageous because thermal resistance is imparted to the polymer.

The olefin-based polymer A according to the invention is such that: (ii) the ratio (Mw/Mn) of the weight average molecular weight (Mw) to the number average molecular weight (Mn) as measured by gel permeation chromatography (GPC) is in the range of 1.0 to 3.5, preferably in the range of 1.0 to 3.0, more preferably 1.0 to 2.8, and even more preferably 1.5 to 2.8.

If the value of Mw/Mn is large, it is disadvantageous for the polymer to manifest its mechanical properties such as toughness and the like. When the value of Mw/Mn is in the rage of 1.0 to 3.5, it is advantageous for the polymer to manifest its mechanical properties such as toughness and the like, and it is industrially valuable.

The olefin-based polymer A according to the invention is such that: (iii) the proportion of the decane-soluble fraction is 1% by weight or less, preferably 0.7% by weight or less, and more preferably 0.5% by weight or less. If the fraction extracted by decane is large, the molding processability is deteriorated, and it is industrially disadvantageous.

The olefin-based polymer A according to the invention has a molecular weight such as that the weight average molecular weight (Mw) determined by gel permeation chromatography (GPC) is, as calculated in terms of polystyrene, preferably 1,000 to 10,000,000, and more preferably 1,500 to 5,000,000.

The olefin-based polymer A according to the invention is such that when the content of the constituent unit derived from an olefin having 2 to 20 carbon atoms in the polymer is 0 to 10% by mole, if the melting point (Tm) measured by DSC and the content (% by mole) of the constituent unit derived from an olefin having 2 to 20 carbon atoms in the polymer satisfy the following relational expression, the randomness in the monomer sequence distribution of the polymer is good, thus the composition is uniform, and the fraction of decane-soluble components is favorably small:

$Tm \leq 240-3.0M$; and more preferably, $220-7.5M \leq Tm \leq 240-3.0M$ wherein M represents the content (% by mole) of the olefin having 2 to 20 carbon atoms).

The olefin having 2 to 20 carbon atoms that is used for the olefin-based polymer A according to the invention, may be exemplified by the same olefins having 2 to 20 carbon atoms that are sued for the 4-methyl-1-pentene-based polymer described above.

The olefin-based polymer A according to the invention preferably has a parameter B value, which indicates the randomness in the sequence distribution of the copolymerized monomers, of 0.9 to 1.5, preferably 0.9 to 1.3, and more preferably 0.9 to 1.2.

When the parameter B value is within the aforementioned range, the randomness of the monomer sequence distribution in the polymer is good, and thus, the mechanical properties and thermal resistance are excellent, and thus, it is favorable.

Olefin-based Polymer B

The olefin-based polymer B according to the invention comprises 50 to 99% by weight, preferably 55 to 95% by weight, of a constituent unit derived from 4-methyl-1-pentene, and 1 to 50% by weight, preferably 5 to 45% by weight, of a constituent unit derived from at least one olefin selected from olefins having 2 to 20 carbon atoms.

The olefin-based polymer B according to the invention is such that: (i) the melting point (Tm) measured by DSC is below 220° C., or unrecognizable.

If the melting point is below 220° C. or unrecognizable, the mechanical properties such as fracture strength, tensile modulus and the like, and stress relaxation are excellent, and thus, a molded product excellent in shock absorbability and heat sealability is obtained, which is favorable.

The olefin-based polymer B according to the invention is such that: (ii) the ratio (Mw/Mn) of the weight average molecular weight (Mw) to the number average molecular weight (Mn) as measured by gel permeation chromatography (GPC) is in the range of 1.0 to 3.5, preferably in the range of 1.0 to 3.0, and more preferably 1.0 to 2.8. If the value of Mw/Mn is large, it is disadvantageous for the polymer to manifest its mechanical properties such as toughness and the like. When the value of Mw/Mn of the polymer is in the rage of 1.0 to 3.5, it is advantageous for the polymer to manifest its mechanical properties such as toughness and the like, and it is industrially valuable.

The olefin-based polymer B according to the invention is such that: (iii) the intrinsic viscosity [η] measured at 135° C. in decalin is 1.0 (dl/g) or greater, preferably 1.5 to 20 (dl/g) or greater, and more preferably 1.8 to 10 (dl/g). If the molecular weight of the polymer is small, the mechanical properties are not manifested sufficiently.

The olefin-based polymer B according to the invention has a molecular weight such as that the weight average molecular weight (Mw) determined by gel permeation chromatography (GPC) is, as calculated in terms of polystyrene, preferably 1,500 to 10,000,000, and more preferably 1,500 to 5,000,000.

The proportion of the components soluble in boiling decane in the olefin-based polymer according to the invention is preferably 0.1% by weight or greater, more preferably 2% by weight or greater, and even more preferably 5% by weight or greater. If the proportion of boiling decane-insoluble components of the polymer is large, uniformity in the composition distribution of the polymer is lost, and it is not preferable.

The olefin having 2 to 20 carbon atoms that is used for the olefin-based polymer B according to the invention, may be exemplified by the same olefins having 2 to 20 carbon atoms that are sued for the 4-methyl-1-pentene-based polymer described above.

The olefin-based polymer B according to the invention preferably has a parameter B value, which indicates the randomness in the sequence distribution of the copolymerized monomers, of 0.9 to 1.5, preferably 0.9 to 1.3, and more preferably 0.9 to 1.2.

When the parameter B value is within the aforementioned range, the randomness of the monomer sequence distribution in the polymer is good, and thus, the mechanical properties and thermal resistance are excellent, and it is favorable.

4-Methyl-1-Pentene Homopolymer

The 4-methyl-1-pentene homopolymer according to the invention is a 4-methyl-1-pentene homopolymer containing over 99.9% by weight of a constituent unit derived from 4-methyl-1-pentene. This 4-methyl-1-pentene-based elastomer may contain a constituent unit derived from an olefin, such as the olefin having 2 to 20 carbon atoms used in the above-mentioned 4-methyl-1-pentene-based polymer, in a proportion of 0.1% by weight or less.

The 4-methyl-1-pentene homopolymer according to the invention is such that: (i) the diad isotacticity is 70% or greater, preferably 80% or greater, more preferably 90% or greater, and even more preferably 95% or greater.

When the diad isotacticity is within the range, good thermal resistance and rigidity can be obtained, and it is favorable.

The 4-methyl-1-pentene homopolymer according to the invention is such that: (ii) the melting point (Tm) measured by DSC is 230° C. or higher, preferably 234° C. or higher.

If the melting point is within the range, the thermal resistance is excellent, and it is favorable.

The 4-methyl-1-pentene homopolymer according to the invention is such that: (iii) the ratio (Mw/Mn) of the weight average molecular weight (Mw) to the number average molecular weight (Mn) as measured by gel permeation chromatography (GPC) is in the range of 1.0 to 3.5, preferably in the range of 1.0 to 3.0, more preferably 1.0 to 2.8, and even more preferably 1.5 to 2.8. If the value of Mw/Mn is large, it is disadvantageous for the polymer to manifest its mechanical properties such as toughness and the like. When the value of Mw/Mn is within the range of 1.0 to 3.5, it is advantageous for the polymer to manifest its mechanical properties such as toughness and the like, and it is industrially valuable.

The 4-methyl-1-pentene homopolymer according to the invention is such that: (iv) the intrinsic viscosity [η] is 0.5 (dl/g) or greater, preferably 1.0 to 20 (dl/g), and more preferably 1.2 to 10 (dl/g).

The 4-methyl-1-pentene homopolymer according to the invention has a molecular weight such as that the weight average molecular weight (Mw) determined by gel permeation chromatography (GPC) is, as calculated in terms of polystyrene, preferably 1,000 to 10,000,000, and more preferably 1,500 to 5,000,000.

The 4-methyl-1-pentene homopolymer according to the invention is preferably such that the proportion of the decane-soluble fraction is 1% by weight or less. If the fraction extracted by decane is large, the molding processability is deteriorated, and it is industrially disadvantageous. The proportion of the decane-soluble fraction is preferably 0.7% by weight or less, and more preferably 0.5% by weight or less.

4-Methyl-1-pentene-based elastomer

The 4-methyl-1-pentene-based elastomer according to the invention is an olefin-based polymer comprising 50 to 90% by weight of a constituent unit derived from 4-methyl-1-pentene, and 10 to 50% by weight of a constituent unit derived from at least one olefin selected from olefins having 2 to 20 carbon atoms.

The 4-methyl-1-pentene-based elastomer according to the invention is such that: (i) the diad isotacticity is 70% or greater, preferably 80% or greater, more preferably 90% or greater, and even more preferably 95% or greater.

When the diad isotacticity is within the range, good thermal resistance and rigidity can be obtained, and it is favorable.

The 4-methyl-1-pentene-based elastomer according to the invention is such that: (ii) the ratio (Mw/Mn) of the weight average molecular weight (Mw) to the number average molecular weight (Mn) as measured by gel permeation chromatography (GPC) is in the range of 1.0 to 3.5, preferably in the range of 1.0 to 3.0, more preferably 1.0 to 2.8, and even more preferably 1.5 to 2.8. If the value of Mw/Mn is large, it is disadvantageous for the polymer to manifest its mechanical properties such as toughness and the like. When the value of Mw/Mn is in the rage of 1.0 to 3.5, it is advantageous for the polymer to manifest its mechanical properties such as toughness and the like, and it is industrially valuable.

The 4-methyl-1-pentene-based elastomer according to the invention is such that: (iii) the intrinsic viscosity [η] is 0.5 (dl/g) or greater, preferably 1.0 to 20 (dl/g), and more preferably 1.2 to 10 (dl/g).

The 4-methyl-1-pentene-based elastomer according to the invention has a molecular weight such as that the weight average molecular weight (Mw) determined by gel permeation chromatography (GPC) is, as calculated in terms of polystyrene, preferably 1,000 to 10,000,000, and more preferably 1,500 to 5,000,000.

The olefin having 2 to 20 carbon atoms that is used for the 4-methyl-1-pentene-based elastomer according to the invention, may be exemplified by the same olefins having 2 to 20 carbon atoms that are sued for the 4-methyl-1-pentene-based polymer described above.

The elastomer according to the invention has a parameter B value, which indicates the randomness in the sequence distribution of the copolymerized monomers, of 0.9 to 1.5, preferably 0.9 to 1.3, and more preferably 0.9 to 1.2.

When the parameter B value is within the aforementioned range, the randomness of the monomer sequence distribution in the polymer is good, and thus, the mechanical properties and thermal resistance are excellent, and thus, it is preferable.

Next, the method for preparing the olefin-based polymers according to the invention will be described.

The preparation of the olefin-based polymers according to the invention suitably uses conventionally known catalysts, for example, magnesium-supported titanium catalysts, the metallocene catalysts described in International Publication of WO 01-53369, International Publication of 01-27124, JP-A-3-193796 or JP-A-02-41303, and the like.

Even more preferably, the preparation of the olefin-based polymer according to the invention suitably uses an olefin polymerization catalyst using a metallocene compound represented by the following Formula (1) or Formula (2):

[Chemical Formula 3]

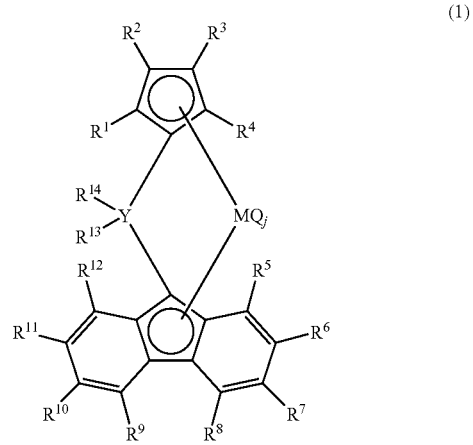

(1)

-continued

[Chemical Formula 4]

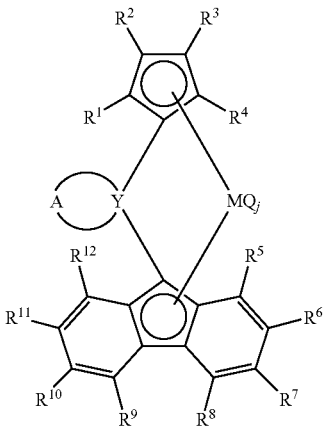

(2)

wherein $R^1$, $R^2 R^3 R^4$, $R^5$, $R^6$, $R^7$, $R^8$, $R^9$, $R^{10}$, $R^{11}$, $R^{12}$, $R^{13}$ and $R^{14}$, which may be identical or different, are each selected from hydrogen, a hydrocarbon group, and a silicon-containing hydrocarbon group; the neighboring substituents from $R^1$ to $R^4$ may be bound to each other to form a ring, while the neighboring substituents from $R^5$ to $R^{12}$ may be bound to each other to form a ring; A is a divalent hydrocarbon group having 2 to 20 carbon atoms, which may contain some unsaturated bonds and/or aromatic rings, while A may contain two or more cyclic structures including a ring formed by A together with Y; M is a metal selected from Group 4 of the Periodic Table of Elements; Y is carbon or silicon; Q is selected from a halogen atom, a hydrocarbon group, an anionic ligand, and a neutral ligand capable of coordination by an electron lone pair and may be of identical or different combinations; and j is an integer from 1 to 4.

For the preparation of the olefin-based polymers according to the invention, more preferably the metallocene compound represented by the following Formula (3) or Formula (4) is used:

[Chemical Formula 5]

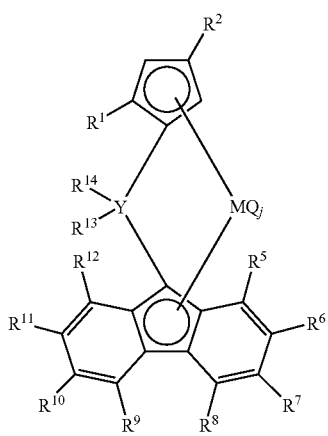

(3)

-continued

[Chemical Formula 6]

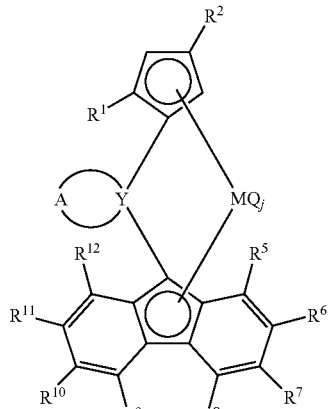

(4)

wherein $R^2$, which may be identical or different, is selected from a hydrocarbon group and a silicon-containing hydrocarbon group; $R^1$, $R^3$, $R^4$, $R^5$, $R^6$, $R^7$, $R^8$, $R^9$, $R^{10}$, $R^{11}$ and $R^{12}$, which may be identical or different, are each selected from hydrogen, a hydrocarbon group and a silicon-containing hydrocarbon group; the neighboring substituents from $R^5$ to $R^{12}$ may be bound to each other to form a ring; A is a divalent hydrocarbon group having 2 to 20 carbon atoms which may contain some unsaturated bonds and/or aromatic rings, and A may contain two or more cyclic structures including a ring formed by A together with Y; M is a metal selected from Group 4 of the Periodic Table of Elements; Y is carbon or silicon; Q is selected from a halogen atom, a hydrocarbon group, an anionic ligand, and a neutral ligand capable of coordination with an electron lone pair and may be of identical or different combinations; and j is an integer from 1 to 4.

$R^1$, $R^2$, $R^3$, $R^4$, $R^5$, $R^6$, $R^7$, $R^8$, $R^9 R^{10}$, $R^{11}$, $R^{12}$, $R^{13}$ and $R^{14}$ of the Formula (1) or Formula (2) are each selected from hydrogen, a hydrocarbon group and a silicon-containing hydrocarbon group, and they may be identical or different.

The hydrocarbon group is preferably an alkyl group having 1 to 20 carbon atoms, an arylalkyl group having 7 to 20 carbon atoms, an aryl group having 6 to 20 carbon atoms, or an alkylaryl group having 7 to 20 carbon atoms, and may containing one or more cyclic structures. Specific examples thereof include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, 1-methyl-1-cyclohexyl, 1-adamantyl, 2-adamantyl, 2-methyl-2-adamantyl, menthyl, norbornyl, benzyl, 2-phenylethyl, 1-tetrahydronaphthyl, 1-methyl-1-tetrahydronaphthyl, phenyl, naphthyl, tolyl and the like.

The silicon-containing hydrocarbon group is preferably an alkylsilyl group or an arylsilyl group having 1 to 4 silicon atoms and 3 to 20 carbon atoms, and specific examples thereof include trimethylsilyl, tert-butyldimethylsilyl, triphenylsilyl and the like. In addition, $R^2$ is preferably a sterically bulky substituent, and more preferably a substituent having 4 or more carbon atoms.

The neighboring substituents from $R^5$ to $R^{12}$ on the fluorene ring may be bound to each other to form a ring. As such substituted fluorenyl group, benzofluorenyl, dibenzofluorenyl, octahydrodibenzofluorenyl, octamethyloctahydrodibenzofluorenyl and the like may be mentioned.

The substituents from $R^5$ to $R^{12}$ on the fluorene ring are preferably bilaterally symmetric, that is, $R^5$=$R^{12}$, $R^6$=$R^{11}$, $R^7$=$R^{10}$, and $R^8$=$R^9$, in view of the feasibility of synthesis, and more preferably a non-substituted fluorene, a 3,6-disubstituted fluorene, a 2,7-disubstituted fluorene, or a 2,3,6,7-tetrasubstituted fluorene. Here, the 3-position, 6-position, 2-position, 7-position on the fluorene ring correspond to $R^7$, $R^{10}$, $R^6$ and $R^{11}$, respectively.

$R^{13}$ and $R^{14}$ of Formula (1) are each selected from hydrogen and a hydrocarbon group, and may be identical or different. Preferred specific examples of the hydrocarbon group include those listed in the above.

Y is carbon or silicon. In the case of Formula (1), $R^{13}$ and $R^{14}$ are bound to Y, and together constitute a substituted methylene group or a substituted silylene group as a bridge. Preferred specific examples thereof include methylene, dimethylmethylene, diisopropylmethylene, methyl tert-butylmethylene, dicyclohexylmethylene, methylcyclohexylmethylene, methylphenylmethylene, diphenylmethylene, methylnaphthylmethylene, dinaphthylmethylene or dimethylsilylene, diisopropylsilylene, methyl tert-butylsilylene, dicyclohexylsilylene, methylcyclohexylsilylene, methylphenylsilylene, diphenylsilylene, methylnahthylsilylene, dinaphthylsilylene and the like.

In the case of Formula (2), Y is bound to the divalent hydrocarbon group A having 2 to 20 carbon atoms, which may contain some unsaturated bonds and/or an aromatic ring, to form a cycloalkylidene group, a cyclomethylenesilylene group or the like. Preferred specific examples thereof include cyclopropylidene, cyclobutylidene, cyclopentylidene, cyclohexylidene, cycloheptylidene, bicyclo[3.3.1]nonylidene, norbornylidene, adamantylidene, tetrahydronaphthylidene, dihydroindanylidene, cyclodimethylenesilylene, cyclotrimethylenesilylene, cyclotetramethylenesilylene, cyclopentamethylenesilylene, cyclohexamethylenesilylene, cycloheptamethylenesilylene and the like.

M in Formula (1) and Formula (2) is a metal selected from Group 4 of the Periodic Table of Elements, and M may be exemplified by titanium, zirconium or hafnium.

Q is a halogen atom, a hydrocarbon group having 1 to 20 carbon atoms, an anionic ligand, or a neutral ligand which is capable of coordination with an electron lone pair, and may be selected to be of identical or different combinations. Specific examples of the halogen atom include fluorine, chlorine, bromine and iodine, while specific examples of the hydrocarbon group include those described above. Specific examples of the anionic ligand include alkoxy groups such as methoxy, tert-butoxy, phenoxy and the like; carboxylate groups such as acetate, benzoate and the like; sulfonate groups such as mesylate, tosylate and the like; and the like. Specific examples of the neutral ligand which is capable of coordination with an electron lone pair include organophosphoric compounds such as trimethylphosphine, triethylphosphine, triphenylphosphine, diphenylmethylphosphine and the like; or ethers such as tetrahydrofuran, diethyl ether, dioxane, 1,2-dimethoxyethane and the like. Among these, Q may be of identical or different combinations, but at least one is preferably a halogen atom or an alkyl group.

The Formula (3) is the same as the Formula (1), except that $R^2$ is selected from a hydrocarbon group and a silicon-containing hydrocarbon group. The Formula (4) is the same as the Formula (2), except that $R^2$ is selected from a hydrocarbon group and a silicon-containing hydrocarbon group. Preferred specific examples of the hydrocarbon group and the silicon-containing hydrocarbon group include the same groups mentioned above.

Specific examples of the metallocene compound according to the invention suitably include the compounds exemplified in the International Publication of WO 01-27124, but the scope of the invention is not intended to be limited thereto.

When the preparation of the olefin-based polymer according to the method of the invention is carried out using a metallocene catalyst, the catalyst component is composed of:

(A) a metallocene compound represented by the Formula (1) or Formula (2); and (B) at least one compound selected from (B-1) an organometallic compound (B-2) an organic aluminum oxy compound, and (B-3) a compound reacting with the metallocene compound (A) and forming an ion pair, and if necessary, also of (C) a microparticulate carrier. In general, the polymerization catalysts of known methods can be utilized, and for example, the method described in the International Publication of WO 01-27124 can be employed.

According to the invention, the polymerization can be performed by any of liquid phase polymerization methods such as solution polymerization, suspension polymerization and the like, or gas phase polymerization methods. For the liquid phase polymerization methods, inactive hydrocarbon solvents may be used, and specifically, aliphatic hydrocarbons such as propane, butane, pentane, hexane, heptane, octane, decane, dodecane, kerosene and the like; alicyclic hydrocarbons such as cyclopentane, cyclohexane, methylcyclopentane and the like; aromatic hydrocarbons such as benzene, toluene, xylene and the like; halogenated hydrocarbons such as ethylene chloride, chlorobenzene, dichloromethane and the like; or mixtures thereof may be mentioned. It is also possible to use the olefins themselves, including 4-methyl-1-pentene, which are used in the polymerization, as the solvent.

When the polymerization is performed, the component (A) is used in an amount of usually $10^{-8}$ to $10^{-2}$ moles, preferably $10^{-7}$ to $10^{-3}$ moles, per 1 liter of the reaction volume.

The component (B-1) is used in an amount such that the molar ratio of the component (B-1) and the transition metal atom (M) in the component (A), [(B-1)/M], is usually 0.01 to 5000, preferably 0.05 to 2000. The component (B-2) is used in an amount such that the molar ratio of the aluminum atom in the component (B-2) and the transition metal atom (M) in the component (A), [(B-2)/M], is usually 10 to 5000, preferably 20 to 2000. The component (B-3) is used in an amount such that the molar ratio of the component (B-3) and the transition metal atom (M) in the component (A), [(B-3)/M], is usually 1 to 10, preferably 1 to 5.

The temperature for the olefin polymerization using such an olefin polymerization catalyst is usually in the range of −50 to 400° C., preferably 10 to 300° C., and more preferably 10 to 250° C. If the polymerization temperature is too low, the polymerization activity per unit catalyst is deteriorated, and it is not desirable from industrial viewpoints.

The polymerization pressure is usually from ambient pressure to 10 MPa gauge pressure, and preferably from ambient pressure to 5 MPa gauge pressure, and the polymerization reaction can be performed in any of the batch mode, semi-continuous mode and continuous mode. Furthermore, it is also possible to perform the polymerization in two or more stages under different reaction conditions.

During the polymerization, hydrogen can be added for the purpose of controlling the molecular weight of the polymer to be produced or the polymerization activity, and the appropriate amount is approximately 0.001 to 100 NL per 1 kg of the olefin.

According to the invention, the olefin supplied together with 4-methyl-1-pentene to the polymerization reaction is preferably an olefin having 2 to 20 carbon atoms, and in particular, an α-olefin having 2 to 10 carbon atoms. Preferred specific examples of the olefin include ethylene, propylene, 1-butene, 1-pentene, 1-hexene, 3-methyl-1-butene, 3-methyl-1-pentene, 3-ethyl-1-pentene, 4methyl--hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, vinylcyclohexane, styrene and the like.

Also for the preferred olefins, dienes having 4 to 20 carbon atoms such as butadiene, 1,4-pentadiene, 1,5-hexadiene, 1,4-hexadiene and the like; cyclic olefins such as dicyclopentadiene, norbornene, methylnorbornene, tetracyclododecene, methyltetracyclododecene and the like; silicon-containing olefins such as allyltrimethylsilane, vinyltrimethylsilane and the like; and the like.

These olefins including 4-methyl-1-pentene may be polymerized individually, or may be polymerized in combination of two or more species.

The 4-methyl-1-pentene-based polymer, the 4-methyl-1-pentene-based copolymer, the olefin-based polymer A, the olefin-based polymer B, the 4-methyl-1-pentene homopolymer and the 4-methyl-1-pentene-based elastomer according to the invention can be differentiated by controlling the melting point, stereoregularity, molecular weight and the like, by adjusting the amounts introduced of 4-methyl-1-pentene and the olefin having 2 to 20 carbon atoms, the type of the polymerization catalyst, the polymerization temperature, the amount of hydrogen added during the polymerization, and the like.

(Uses)

Hereinafter, the uses of the olefin-based polymers according to the invention will be described. Here, the polymer according to the invention refers to the 4-methanyl-1-pentene-based polymer, the 4-methyl-1-pentene-based copolymer, the olefin-based polymer A, the olefin-based polymer B, or the 4-methyl-1-pentene homopolymer, while the elastomer according to the invention refers to the 4-methyl-1-pentene-based elastomer.

The polymer or elastomer according to the invention is an olefin-based polymer having excellent thermal resistance, releasability, optical properties, electrical properties, chemical resistance, weather resistance, and mechanical properties such as toughness and the like, and can be processed by various molding methods such as calendar molding, extrusion molding, injection molding, blow molding, press molding, stamping molding and the like. Therefore, the polymer or elastomer according to the invention can be used for the applications such as injection molded articles, blow molded vessels, films or sheets, fabrics and the like, and also can be used for those applications without limitation. For the use in injection molded products, since the polymer or elastomer according to the invention has less mold contamination and is excellent in safety and hygiene, the polymer or elastomer can be suitably used for the applications of syringe, animal gauge and the like.

The polymer or elastomer according to the invention can be suitably used for the applications of various industrial materials, physicochemical experimental instruments, food containers such as thermally resistant tableware and the like, peel-off materials, wire coating, materials for general consumption such as various caps and the like.

For processed products, the polymer or elastomer according to the invention is suitably used in various molding processed products, specifically such as interior and exterior decoration materials for automobile, which are exemplified by automobile members, such as automobile interior decoration parts such as door trim, instrument panel and the like, and automobile exterior decoration parts such as bumper, mud guard and the like, or gasoline tank; electric appliance members such as hot plate, rice cooker, pot body, washing machine or the like; containers such as battery container and the like; medical instruments such as syringe barrel, ampoule, Petri dish and the like; mandrel for high pressure rubber hose, LED mold, microwave ovenware, freshness maintenance pack and the like.

The films or sheets are suitably used, without limitation, as protective films or sheets having excellent transparence, appearance and mechanical strength properties. The sheets or films are also used as release films that are used in the production of electronic circuit board. The sheets or films can be also used to obtain molded products such as non-woven fabric laminate, laminate on paper, and the like. The film or sheet according to the invention is a multilayer film or sheet formed from two or more layers having different compositions, and at least one layer of these layers may have a multilayer structure including a layer formed from the polymer or elastomer according to the invention. Such multilayer films or sheets are excellent in appearance and mechanical strength properties. Since the films or sheets obtained using the polymer or elastomer according to the invention are particularly excellent in transparency, thermal resistance and anti-clouding, they are preferably used as wrapping films for agricultural use and foodstuff, and as baking cartons. They are also suitably used for release liner for synthetic leather.

The fiber using the polymer or elastomer according to the invention is not particularly limited in the use, and is suitably used as the fiber for rope, fiber for non-woven fabric, or for non-woven fabric. The fiber is particularly suitably used for thermally resistant battery separators. Moreover, a filament can be produced by, for example, extruding a molten composition through a spinneret.

The blow molded vessels can be used without particular limitation, but this blow molded vessels have excellent transparency and mechanical strength properties. Thus, the blow molded vessels are suitably used as solid detergent containers, as well as containers for liquid detergent, cosmetic toner or the like, and as containers for foodstuff and beverage.

The polymer or elastomer according to the invention is also suitably used as a damping material (including soundproofing material). The damping material is a material for absorbing vibrational energy, and the performance can be compared using the loss coefficient (tan δ) of the absorbed energy.

The polymer or elastomer according to the invention is used to form a polymer composition which contains at least one of the polymers and elastomer according to the invention and a thermoplastic resin other than the present invention, and is used for molded products such as molded products for construction and civil works, electric and electronic parts, molded products for medical use, miscellaneous molded products, and the like.

The polymer or elastomer according to the invention may be used without modification, and also can be used after being compounded with inorganic filler such as magnesium hydroxide, or a crosslinking agent such as vinyltrimethoxysilane. The polymer or elastomer according to the invention can be compounded with various additives, if necessary, for example, softening agent, stabilizing agent, filler, antioxidant, crystal nucleating agent and the like, within the scope of not impairing the purpose of the invention.

The polymer or elastomer according to the invention can be also used to obtain an excellent material for magnetic recording by kneading at least one of the polymers and elastomer according to the invention together with a magnetic powder. In this case, the mixing ratio of the polymer or elastomer according to the invention and the magnetic powder (sum of polymers and elastomer according to the invention/magnetic powder; weight ratio) is preferably 99/1 to 10/90. The mixtures thus obtained can be favorably used in stationery and the like as plastic magnet.

According to the invention, the polymer or elastomer according to the invention can be used after being compounded with inorganic filler. The amount of addition thereof is usually 10 to 60 parts by weight, preferably 20 to 40 parts by weight, of the inorganic filler based on 100 parts by weight of the polymer or elastomer according to the invention.

The polymer or elastomer according to the invention can be formed into a composition containing at least one of the polymers and elastomer according to the invention, and a resin (excluding the polymer or elastomer according to the invention), rubber, lubricating material, wax, cement or ink/coating material.

The polymer or elastomer according to the invention may be formed into a dispersion containing at least one of the polymers and elastomer according to the invention, and a thermoplastic resin other than the polymer or elastomer according to the invention, and may be suitably used as an aqueous resin dispersion or an oily resin dispersion. For a such dispersion, the amount of each component mixed is not particularly limited; however, it is preferable to use 0.01 to 150 parts by weight of the polymer or elastomer according to the invention and if necessary, 0.01 to 300 parts by weight of a filler, more preferably 0.1 to 20 parts by weight of the polymer or elastomer according to the invention and 0.1 to 40 parts by weight of a filler, and even more preferably 0.5 to 10 parts by weight of the polymer or elastomer according to the invention and 0.5 to 20 parts by weight of a filler, based on 100 parts by weight of the thermoplastic resin.

The polymer or elastomer according to the invention is also suitably used for the following applications of release film, fabric (non-woven fabric), damping material (vibration-proof material, soundproofing material), and the like.

Release Film

The polymer or elastomer according to the invention is suitably used for a release film that is used in the production of printed circuit boards, particularly flexible printed circuit boards. More particularly, the polymer or elastomer is used for a release film having excellent mold releasing property, resistance to contamination and resistance to moisture absorption.

In the process for production of printed wire boards, flexible printed wire boards, multilayer printed wire boards, and the like, a release film is used when a copper clad laminate or a copper foil is hot pressed with insertion of a prepreg or a thermally resistant film. Furthermore, in the process for production of flexible printed circuit boards, when hot pressing a coverlay film by means of a thermally curable adhesive to the main board of a flexible printed circuit board, onto which an electric circuit has been formed, for the purpose of preventing adhesion between the coverlay film and the press hot plate, or when simultaneously producing a plurality of single-layered or multilayer printed circuit boards, for the purpose of preventing adhesion between printed circuit boards or protecting printed circuit board products, a method of inserting a release film is widely practiced.

As such release film, polymethylpentene films, silicone-coated polyester films, fluorinated films, syndiotactic polystyrene films, alicyclic polyolefin films, polyamide films, polyether aromatic ketone resin films and the like have been conventionally proposed.

However, the release films proposed above have a problem of releasability from the coverlay film or the like, in particular, the phenomenon of unsettled plating by copper foil transferring during the production of multilayer flexible wire boards.

Moreover, from the increasing social demand on environmental problems or safety problems of recent years, these release films are also required to have resistance to moisture absorption, rigidity and resistance to contamination, in addition to the thermal resistance enduring the hot press molding, and the function of releasing from printed wire boards (including polyimide resins or epoxy resins, epoxy adhesives, copper foil and the like) or hot press plates.

The release film of the invention may be a film having a single layer structure comprising the polymer or elastomer according to the invention, or may be a film having a multilayer structure comprising a layer (P) of the polymer or elastomer according to the invention and a layer of another resin.

In particular, it is more preferable for the release film used for the production of flexible printed circuit boards to be a multilayered film, from the viewpoint of providing cushioning properties, by which the release film closely adheres to the polyimide film and the irregularities on the copper foil to attenuate the impact upon pressurization by hot pressing (hereinafter, simply referred to as adherence).

The thickness of the release film of the invention is 3 to 100 μm in the case of using a monolayer film. The thickness is preferably 10 to 100 μm, and particularly preferably 30 to 60 μm, from the viewpoints of costs and handlability. In the case of using a multilayer film, the total thickness of the release film is 50 to 300 μm, and from the viewpoints of adherence and operability, the total thickness is preferably 70 to 250 μm, and more preferably 100 to 200 μm. In the case of a multilayered film, the ratio of the thickness of the intermediate layer (Q) to the total thickness is preferably 50% or greater, more preferably 60% or greater, and even more preferably 70% or greater.

The release film of the invention can be obtained by extrusion film molding using the polymer or elastomer according to the invention as the raw material.

The release film of the invention can be produced by a tubular extrusion method, optionally called an inflation method as well. It is extremely important to control the temperature of a parison by appropriately selecting the temperature from a temperature range from 50 to 290° C., lest the parison obtained from the cylinder is cooled immediately, in the aspect of rendering the sheet thickness uniform. A multilayered film can be obtained by subjecting the resin originating from the (P) layer and the resin component originating from the (Q) layer to multilayer lamination.

The release film of the invention can be also produced by T-die extrusion molding. In this case, the release film may be used without stretching, or may be used after uniaxial stretching or biaxial stretching. If it is desired to increase the strength and rigidity of the sheet, stretching is effective therefor. For the method for multilayer lamination of the resin originating from the (P) layer and the resin originating from the (Q) layer, the methods of dry lamination and co-extrusion lamination may be mentioned. In the case of dry lamination, a single layer film of the (P) layer is first produced, and while such a single layer film is fed to the upper side and lower side of a T-die, the resin forming the (Q) layer, for example, an elastomer, can be extruded from the T-die, thereby to laminate into a roll. This method is particularly effective in the case where the viscosities of the resin of the (P) layer and the resin of the (Q) layer are largely different. On the other hand, in the case of co-extrusion lamination, the polymer or elastomer according to the invention, which forming the (P) layer, and the resin component forming the (Q) layer can be laminated using multilayer dies in an extruder. This method is economical because the lamination can be effected in one stage.

The release film of the invention is excellent in the releasability, resistance to contamination, and resistance to moisture absorption, and improves the phenomenon of unsettled plating by copper foil transferring during the production of multilayer flexible wire boards. Furthermore, the release film is excellent in adherence, smudging property of the adhesive, close adhesion between multilayer films, and slipping properties between films, and thus the release film of the invention is a release film appropriate for the production of printed circuit boards, and particularly flexible printed circuit boards.

Non-woven Fabrics

According to the invention, in the case of producing a non-woven fabric comprising monolayer fibers, the production can be carried out by a spun-bonding method, a carding method, a melt blowing method or the like. The polymer or elastomer according to the invention is suitably used for fibers, particularly microfibers for non-woven fabrics such as battery separators, masks, various filters and the like. The fiber obtained from the polymer or elastomer according to the invention is suitable for battery separators which are formed from high melting point polymer fibrous porous sheets. More specifically, the fiber is highly suitable for battery separators which are particularly useful for lithium ion batteries and are excellent in the shutdown characteristics.

In general, a necessary function required in non-woven fabrics for filter is high dust-collecting property, and a necessary function required in non-woven fabrics for battery separator is high ability to maintain liquid and thermal resistance. In order to enhance such functions, it is necessary to enhance the thermal resistance and to make the structure of the non-woven fabrics more denseness by rendering the diameter of the fiber which forms the non-woven fabric thinner. However, if polypropylene resin is used as the raw material, thermal resistance thereof is insufficient.

The microfiber of the invention is produced by the above-mentioned methods using the polymer or elastomer according to the invention, and the fiber becomes a microfiber having a fineness of less than 0.5 denier. A non-woven fabric is formed by a wet papermaking method, a sintering method, a needle punching method, a carding method, a cross-layering method, a random webber method, an air foaming method or the like, using the microfiber obtained. Moreover, the non-woven fabric can be subjected to thermal adhesion molding by means of heat rolls or the like, in accordance with the use, to form battery separators or filters. The non-woven fabric according to the invention is such that, when the fiber forming the non-woven fabric has a fineness of less than 0.5 denier, the ability to maintain liquid of the battery separator formed therefrom is enhanced, and the dust collecting and filtering ability of the filter formed therefrom is enhanced.

Damping Material

The polymer or elastomer according to the invention, particularly the elastomer according to the invention, is relevant to high damping function that is required in a wide range of industrial applications, and is suitably used for a damping material having excellent damping properties and molded articles thereof. More specifically, the polymer or elastomer according to the invention is suitable for the damping material for non-vinyl chloride-based polymeric materials having good dynamic properties (breaking strength, tensile modulus). Specific applications thereof may be exemplified by office automation (OA) instruments, electric appliances such as washing machine and the like, automobile, machining machines, industrial machines, as well as floor material, damping panel, damping molded articles, and the like.

As already well known, damping materials are widely used for the purpose of preventing and suppressing the vibration created by the elements of instruments such as OA instruments, electric appliances, automobile, machining machines, industrial machines and the like, to an adequate level. Furthermore, there are also industries requiring a material having specific damping function in order to obtain high quality sound, such as in speakers for audio instruments, and the like. Traditionally, compositions of polymeric materials having peak values for large loss coefficients, tan $\delta$, in the measurement of dynamic viscoelasticity, which serves as an index of the damping property of polymeric materials, have been used as the material having vibrational characteristics. For example, styrene-isoprene-styrene block copolymers (SIS) or hydrogenation products thereof may be mentioned.

However, the SIS mentioned above has a peak for large tangent loss near room temperature, and thus has excellent damping properties near room temperature, but has deteriorated damping properties at a temperature except near the peak temperature because the peak for the loss tangent, tan $\delta$, is sharp. Further, since the hydrogenated SIS is produced by a complicated process comprising two stages of polymerization and hydrogenation, the production costs are high, and the scope of industrial applications is limited. Rubber-based damping materials have excellent characteristics in the aspect of performance, but it is currently difficult to apply the damping material to any arbitrary shape during the processing. Polypropylene has a peak for loss coefficient near room temperature, but has defects such as that the peak value is small, and the dimensional accuracy during molding is low. Polyvinyl chloride (PVC)-based damping materials often adversely affect the environment, by generating toxic gases during incineration, or the like.

The damping material of the invention is characterized by containing the polymer or elastomer according to the invention, but in particular, a damping material containing the 4-methyl-1-pentene-based elastomer has a high peak value for the loss coefficient, tan $\delta$, and is preferred. In particular, the 4-methyl-1-pentene-based elastomer has a high peak value for the loss coefficient, tan $\delta$, and thus is preferable. Particularly when the 4-methyl-1-pentene-based elastomer is a copolymer of 4-methyl-1-pentene and an $\alpha$-olefin having 2 to 4 carbon atoms, the peak value for the loss coefficient, tan $\delta$, is high and particularly preferable.

If needed, a thermoplastic resin (B) (excluding the polymer or elastomer according to the invention; hereinafter, the same) may be added to the damping material of the invention. The thermoplastic resin (B) that is added to the damping material of the invention if needed, may be exemplified by olefin-based polymers other than the polymer or elastomer according to the invention, or styrene-based polymers. Examples of the olefin-based polymer other than the polymer or elastomer according to the invention include polyethylene, polypropylene and copolymers of polypropylene and ethylene and/or propylene and $\alpha$-olefins, and the like. Examples of the styrene-based polymer include polystyrene, high impact polystyrene, styrene.methacrylic acid ester copolymers (MS), acrylonitrile.styrene copolymers (AS), acrylonitrile.butadiene.styrene copolymers (ABS), and the like. These thermoplastic resins can be used in combination of two or more species. Among those, olefin-based polymers other than the polymer or elastomer according to the invention, and styrene-based polymers are preferred from the viewpoints of compatibility, moldability and the like. The molecular weight of such thermoplastic resin is not particularly limited, but if the weight average molecular weight calculated in terms of polystyrene is in the range of preferably 5,000 to 1,000,000, and more preferably 50,000 to 500,000, it is possible to obtain the characteristics of the invention, moldability and the like to be in good balance.

The amount of the thermoplastic resin (B) added is 0 to 99% by weight, preferably 0 to 80% by weight, and more preferably 0 to 60% by weight, relative to 1 to 100% by weight of the polymer or elastomer (A) according to the invention. If the amount added exceeds 99% by weight, that is, the component (A) is contained in an amount of less than 1% by weight, the characteristics of the component (A), for example, the damping properties, dynamic characteristics, thermal resistance and chemical resistance cannot be manifested. The proportion of the component (A) is 1 to 100% by weight. In order to sufficiently exhibit the damping properties originally possessed by the component (A), the proportion of the component (A) is preferably 20 to 100% by weight, and more preferably 40 to 100% by weight.

The damping material of the invention can be compounded with inorganic filler materials, if needed. Examples of the inorganic filler material include mica (scale-shaped; i.e., flake-shaped mica, etc.), talc, clay, calcium carbonate, aluminum hydroxide, hydrotalcite, glass fiber, glass beads, glass balloon, glass flakes, silica, carbon black, graphite, titanium oxide, magnesium hydroxide, potassium titanate whiskers, carbon fiber, and the like. The shape is not particularly limited, and may be scaly, spherical, granular, powdery, irregularly shaped, or the like. Addition of the inorganic filler material can result in enhancement in the damping properties, mechanical properties such as elastic modulus and the like, dimensional stability, chemical resistance, and the like. However, the fluidity may be deteriorated. The amount of such inorganic filler material to be added is 0 to 100 parts by weight, preferably 0 to 70 parts by weight, and more preferably 0 to 40 parts by weight, relative to 100 parts by weight of the sum of the polymer or elastomer (A) according to the invention and the thermoplastic resin (B).

The damping material of the invention may be compounded, if necessary, with plasticizer, stabilizer, lubricant, antistatic agent, impact strength improving agent, processing aid, ultraviolet ray absorbent, antioxidant, organic or inorganic foaming agent, crosslinking agent, co-crosslinking agent, crosslinking aid, adhesive, softening agent, coloring pigment, or flame retardant. Examples of the crosslinking agent include organic peroxides such as dicumyl peroxide, 2,5-dimethyl-2,5-bis-t-butylperoxyhexene or the like, sulfur, morpholinedisulfide and the like, and these may be used in combination with crosslinking aids, for example, stearic acid, zinc oxide and the like. Examples of the adhesive include terpene-based resins, rosin-based resins, coumaron.indene resins and the like. Examples of the softening agent include paraffins, process oils, petroleum resins and the like.

The damping material of the invention is such that the maximum value of the loss tangent of the dynamic viscoelasticity, tan δ, as measured at a temperature range from −100° C. to +100° C. at a frequency of 1.6 Hz, is 0.1 to 10. The maximum value of tan δ is preferably 0.4 to 8, particularly preferably 0.6 to 5, and more preferably 0.8 to 4. If the maximum value of tan δ is within this range, it is possible to exhibit excellent damping characteristics. Here, the maximum value is determined based on sufficiently averaged data after considering variations in the measurement.

The apparatus for obtaining the damping material of the invention may be exemplified by melt kneading instruments such as single-screw or twin-screw extruder, Banbury mixer, ribbon blender, planetary mixer, Brabendar, plastmill, heating roll, or the like. The melt kneading temperature is not particularly limited, but is in general preferably in the range of 150 to 280° C. In addition, the instruments mentioned above can be used in combination with mixers such as tumbler, Henschel mixer or the like.

The damping material according to the invention has a very high peak value for the loss coefficient for dynamic viscoelasticity, tan δ, near room temperature, and further has good dynamic properties (breaking strength, tensile modulus), chemical resistance, and stress relieving properties.

The damping material and molded articles of the invention can be applied to OA instruments, industrial machines, automobile, railways, bridges, ships, construction materials, interior decoration materials, electric appliances such as air conditioner, washing machine and the like, as a damping material or a soundproofing material.

EXAMPLES

Hereinafter, the present invention will described in more detail with reference to Examples, but the invention is not intended to be limited by these Examples.

According to the invention, the melting point (Tm), molecular weights (Mw, Mn), decane-soluble fraction, intrinsic viscosity [η], and isotactic diad fraction of a polymer were determined by the following methods.

[Melting Point (Tm)]

The melting point (Tm) of a polymer was calculated from the crystal melting peak obtained by measurement of differential scanning calorimetry (DSC), after maintaining a polymer sample at 280° C. for 5 minutes, cooling the polymer sample to 20° C. and maintaining at the temperature for 5 minutes, and heating at a rate of 10° C./min.

[Molecular Weights (Mw, Mn)]

The molecular weights (Mw, Mn) were measured by gel permeation chromatography (GPC; calculated in terms of polystyrene).

[Decane-soluble Fraction]

The decane-soluble fraction was obtained by treating a polymer with n-decane at 150° C. for 2 hours, returning to room temperature, and measuring the percentage by weight that was dissolved in n-decane.

[Intrinsic Viscosity [η]]

The intrinsic viscosity [η] was measured at 135° C. in decalin.

[Diad Isotacticity]

The diad isotacticity of an olefin-based polymer was determined from a $^{13}$C-NMR spectrum using the following equation, by defining the diad isotacticity to be, when a sequence of any two head-to-tail bonded 4-methyl-1-pentene units in the polymer chain was expressed in a planar zigzag structure, the fraction of the isobutyl branches lying in the same direction:

Diad isotacticity (%)=[m/(m+r)]×100 wherein m and r each represent the absorption intensities originating from the main chain methylene in the 4-methyl-1-pentene units that are head-to-tail bonded, represented by the following:

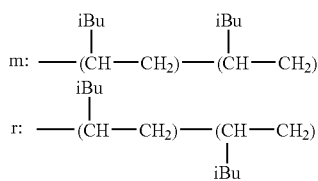

The $^{13}$C-NMR spectrum was measured by a proton complete decoupling method using a magnetic nuclear resonance apparatus having a $^1$H-resonance frequency of 400 MHz, after completely dissolving a sample in a solvent prepared by adding about 0.05 ml of deuterated benzene, which is a lock solvent, to about 0.5 ml of hexachlorobutadiene, o-dichlorobenzene or 1,2,4-trichlorobenzene in an NMR sample tube (5 mmφ). The measuring conditions were selected to have a flip angle of 45°, and a pulse interval of 5 sec or greater. The chemical shift was set using benzene to be at 127.7 ppm, and the chemical shifts of other carbon peaks were based on this.

The peak region was classified into a first region of high magnetic field, and a second region of low magnetic field, by delimiting the region of 41.5 to 43.3 ppm as the local minimum point of peak profile. In the first region, the main chain methylenes in the bimolecular sequences of 4-methyl-1-pentene units represented by (m) resonated, but since the peaks of the methylene linked to the co-monomers were also overlapped, the integration value obtained by subtracting two times the peak area originating from the co-monomers at 34.5 to 35.5 ppm from the first region, was referred to as "m".

In the second region, the main chain methylenes in the bimolecular sequences of 4-methyl-1-pentene units represented by (r) resonated, and the integration value was referred to as "r".

Example 1a

To a glass polymerization vessel having an internal volume of 500 ml, which was equipped with a stirrer and was sufficiently purged with nitrogen, 4-methyl-1-pentene (400 ml) was introduced, and the temperature was maintained at 45° C. Isopropyl-(3-t-butyl-5-methylcyclopentadienyl)(fluorenyl) zirconium dichloride (5.1 mg), activated with 4 mmol (in terms of Al atoms) of methylaluminoxane (MAO, Albemarle Corp., a 10% toluene solution), was added thereto, and while maintaining the temperature at 45° C., polymerization was carried out for 1 hour. Methanol was introduced into the polymerization vessel to terminate the polymerization, and the polymerization liquor was poured onto 2 L of methanol containing hydrochloric acid and was filtered to recover a polymer. The obtained polymer was dried under reduced pressure at 80° C. for 10 hours to obtain 11.3 g of the polymer. The polymer had an intrinsic viscosity [η] of 1.60 dl/g, Tm=235.4° C., Mw=426,000 and Mn=155,000 as measured by GPC, and Mw/Mn=2.7. The proportion of the decane-soluble fraction of the polymer was 0.1% by weight or less.

Example 2a

The polymerization was carried out in the same manner as in Example 1a, except that isopropyl-(3-t-butyl-5-methylcyclopentadienyl)(3,6-di-t-butylfluorenyl)zirconium dichloride (6.2 mg) was used instead of isopropyl-(3-t-butyl-5-methylcyclopentadienyl)(fluorenyl)zirconium dichloride (5.1 mg), thus to obtain 22.9 g of a polymer. The polymer had an intrinsic viscosity [η] of 1.77 dl/g, Tm=236.1° C., Mw=460,000 and Mn=191,000 as measured by GPC, and Mw/Mn=2.4. The diad isotacticity of the polymer was 99.1%, and the proportion of the decane-soluble fraction of the polymer was 0.1% by weight or less.

Example 3a

The polymerization was carried out in the same manner as in Example 2a, except that decene (4 ml) was added to 4-methyl-1-pentene (396 ml), thus to obtain 23.8 g of a polymer. The polymer had an intrinsic viscosity [η] of 2.65 dl/g, Tm=229.8° C., Mw=423,000 and Mn=177,000 as measured by GPC, and Mw/Mn=2.4. The content of decene in this polymer as determined by NMR measurement was 1.5% by mole, the diad isotacticity of the polymer was 98.5%, and the proportion of the decane-soluble fraction of the polymer was 0.2% by weight.

Comparative Example 1a

The polymerization was carried out in the same manner as in Example 1a, except that dimethylsilylenebis(4-phenyl-2-methylindenyl)zirconium dichloride (6.3 mg) was used instead of isopropyl-(3-t-butyl-5-methylcyclopentadienyl)(fluorenyl)zirconium dichloride (5.1 mg). However, no polymer was obtained.

Comparative Example 2a

The polymerization was carried out in the same manner as in Example 1a, except that ethylenebis(indenyl)zirconium dichloride (4.2 mg) was used instead of isopropyl-(3-t-butyl-5-methylcyclopentadienyl)(fluorenyl)zirconium dichloride (5.1 mg), thus to obtain 40.4 g of a polymer. The polymer had an intrinsic viscosity [η] of 0.21 dl/g, a diad isotacticity of 94.4%, Tm=218.4° C., Mw=55,000 and Mn=21,000 as measured by GPC, and Mw/Mn=2.6.

Comparative Example 3a

To a polymerization vessel having an internal volume of 3 L, which was equipped with a stirrer and was sufficiently purged with nitrogen, n-decane (1.5 L) was introduced, and then titanium trichloride (13.3 mmol), diethylaluminum chloride (266 mmol), and hydrogen (1.2 L) were introduced. While stirring the mixture, the internal temperature was maintained at 50° C. 470 g of 4-methyl-1-pentene and 30 g of decene-1 were fed to the polymerization vessel at 50° C. over 90 minutes, and then the polymerization was further carried out for 4 hours. Isobutanol (90 ml) was added to terminate the polymerization, and the polymer was recovered by filtration under nitrogen. The recovered polymer washed four times with n-decane (1.2 L) containing 5% of isobutanol, and dried under reduced pressure at 80° C. for 10 hours to obtain 410 g of a polymer. The content of decene-1 in the obtained polymer was 3.2% by weight, and the polymer had Tm=234.4° C., Mw=2,150,000 and Mn=82,400 as measured by GPC, and Mw/Mn=26.1. The [η] was 4.6 (dl/g), and the proportion of the decane-soluble fraction of the polymer was 3.5% by weight.

Example 1b

To a glass polymerization vessel having an internal volume of 500 ml, which was equipped with a stirrer and was sufficiently purged with nitrogen, 4-methyl-1-pentene (300 ml) and 1-hexene (100 ml) were introduced, and the temperature was maintained at 45° C. Diphenylmethylene-(3-t-butyl-4-methylcyclopentadienyl)(2,7-di-t-butylfluorenyl)zirconium dichloride (7.2 mg), activated with 4 mmol (in terms of Al atoms) of methylaluminoxane (MAO, Albemarle Corp., a 10% toluene solution), was added thereto, and while maintaining the temperature at 45° C., polymerization was carried out for 4 hours. Methanol was introduced into the polymerization vessel to terminate the polymerization, and the polymerization liquor was poured onto 2 L of methanol containing hydrochloric acid and was filtered to recover the polymer. The obtained polymer was dried under reduced pressure at 80° C. for 10 hours to obtain 84.7 g of a polymer. The content of 1-hexene in the polymer was 30.6% by mole. The polymer had Tm=157.0° C., [η] measured in decalin of 1.99 (dl/g), a molecular weight distribution obtained by GPC, Mw/Mn=2.5, and a diad isotacticity of 96.2%.

Example 2b

The polymerization was carried out for 2 hours in the same manner as in Example 1b, except that 1-octene was used instead of 1-hexene, to obtain 68.39 g of a polymer. The content of 1-octene in the polymer was 29.0% by mole. The polymer had Tm=106.6° C., [η] measured in decalin of 2.11 (dl/g), and a molecular weight distribution obtained by GPC, Mw/Mn=2.7.

Example 3b

The polymerization was carried out for 3 hours in the same manner as in Example 1b, except that 1-decene was used instead of 1-hexene, to obtain 118.51 g of a polymer. The content of 1-decene in the polymer was 29.4% by mole. The polymer had no observable melting point, and had [η] measured in decalin of 2.08 (dl/g), a molecular weight distribution obtained by GPC, Mw/Mn=2.4, and a diad isotacticity of 96.0%.

Example 4b

To a glass polymerization vessel having an internal volume of 500 ml, which was equipped with a stirrer and was sufficiently purged with nitrogen, 4-methyl-1-pentene (200 ml) and decane (200 ml) were introduced, and the temperature was maintained at 45° C. While blowing ethylene gas (50 NL/h) at ambient pressure, isopropyl-(3-t-butyl-5-methylcyclopentadienyl)(3,6-di-t-butylfluorenyl)zirconium dichloride (6.2 mg), activated with 4 mmol (in terms of Al atoms) of methylaluminoxane (MAO, Albemarle Corp., a 10% toluene solution), was added thereto, and while maintaining the temperature at 25° C., polymerization was carried out for 40 minutes. Methanol was introduced into the polymerization vessel to terminate the polymerization, and the polymerization liquor was poured onto 2 L of methanol containing hydrochloric acid and was filtered to recover a polymer. The obtained polymer was dried under reduced pressure at 80° C. for 10 hours to obtain 22.92 g of the polymer. The content of ethylene in the polymer was 23.4% by mole. The polymer had no observable melting point, and had [η] measured in decalin of 4.50 (dl/g), and a molecular weight distribution obtained by GPC, Mw/Mn=2.9.

Example 5b

The polymerization was carried out for 10 minutes in the same manner as in Example 4b, except that isopropyl-(3-t-butyl-5-methylcyclopentadienyl)(fluorenyl)zirconium dichloride (5.1 mg) was used instead of isopropyl-(3-t-butyl-5-methylcyclopentadienyl)(3,6-di-t-butylfluorenyl)zirconium dichloride (6.2 mg), to obtain 25.54 g of a polymer. The content of ethylene in the polymer was 10.4% by mole. The polymer had no observable melting point, and had [η] measured in decalin of 2.87 (dl/g), and a molecular weight distribution obtained by GPC, Mw/Mn=2.6.

Example 6b

The polymerization was carried out for 40 minutes in the same manner as in Example 4b, except that 4-methyl-1-pentene (100 ml) and decane (300 ml) were used, to obtain 26.18 g of a polymer. The content of ethylene in the polymer was 33.0% by mole. The polymer had no observable melting point, and had [η] measured in decalin of 3.09 (dl/g), and a molecular weight distribution obtained by GPC, Mw/Mn=2.7.

Example 7b

To a glass polymerization vessel having an internal volume of 500 ml, which was equipped with a stirrer and was sufficiently purged with nitrogen, 4-methyl-1-pentene (200 ml) and decane (200 ml) were introduced, and the temperature was maintained at 45° C. While blowing propylene gas (30 NL/h) at ambient pressure, diphenylmethylene-(3-t-butyl-5-methylcyclopentadienyl)(2,7-di-t-butylfluorenyl)zirconium dichloride (7.2 mg), activated with 4 mmol (in terms of Al atoms) of methylaluminoxane (MAO, Albemarle Corp., a 10% toluene solution), was added thereto, and while maintaining the temperature at 25° C., polymerization was carried out for 150 minutes. Methanol was introduced into the polymerization vessel to terminate the polymerization, and the polymerization liquor was poured onto 2 L of methanol containing hydrochloric acid and was filtered to recover a polymer. The obtained polymer was dried under reduced pressure at 80° C. for 10 hours to obtain 20.79 g of the polymer. The content of propylene in the polymer was 24.0% by mole. The polymer had no observable melting point, and had [η] measured in decalin of 2.10 (dl/g), and a molecular weight distribution obtained by GPC, Mw/Mn=2.5.

Example 8b

The polymerization was carried out for 150 minutes in the same manner as in Example 7b, except that 4-methyl-1-pentene (100 ml) and decane (300 ml) were used, to obtain 24.24 g of a polymer. The content of propylene in the polymer was 47.0% by mole. The polymer had no observable melting point, and had [η] measured in decalin of 2.12 (dl/g), and a molecular weight distribution obtained by GPC, Mw/Mn=2.6.

Comparative Example 1b

The polymerization was carried out in the same manner as in Example 1b, except that dmethylsilylenebis(4-phenyl-2-methylindenyl)zirconium dichloride (6.3 mg) was used instead of isopropyl-(3-t-butyl-5-methylcyclopentadienyl)(fluorenyl)zirconium dichloride (5.1 mg). However, no polymer was obtained therefrom.

Comparative Example 2b

The polymerization was carried out for 30 minutes in the same manner as in Example 4b, except that ethylenebis(indenyl)zirconium dichloride (4.2 mg) was used instead of isopropyl-(3-t-butyl-5-methylcyclopentadienyl)(fluorenyl)zirconium dichloride (5.1 mg), to obtain 17.7 g of a polymer. The content of ethylene in the polymer was 20.4% by mole. The polymer had no observable melting point, and had [η] measured in decalin of 0.43 (dl/g).

Comparative Example 3b

To a polymerization vessel having an internal volume of 3 L, which was equipped with a stirrer and was sufficiently purged with nitrogen, n-decane (1.5 L) was introduced, and then titanium trichloride (13.3 mmol), diethylaluminum chloride (266 mmol), and hydrogen (1.2 L) were introduced. While stirring the mixture, the internal temperature was maintained at 50° C. 4-methyl-1-pentene (380 g) and 1-decene (120 g) were fed to the polymerization vessel at 50° C. over 90 minutes, and then the polymerization was further carried out for 4 hours. Isobutanol (90 ml) was added to terminate the polymerization, and a polymer was recovered by filtration under nitrogen. The recovered polymer was dried under reduced pressure at 80° C. for 10 hours to obtain 380 g of a polymer. The content of 1-decene in the obtained polymer was 14.7% by mole, and the polymer had a melting point of 173° C., [η] measured in decalin of 2.95 (dl/g), and a molecular weight distribution obtained by GPC, Mw/Mn=9.9.

Example 1c

[Production of Film]
To the polymer obtained in Example 3a, a neutralizing agent and a phenolic antioxidant, that are conventionally known, were added and mixed in a Henschel mixer. The mixture was melt kneaded using an extruder at 290° C. to obtain pellets. The melt flow rate of the obtained pellets was 25 g/10 min.

Thereafter, the pellets were molded into a film using a film cast molding machine equipped with a T-die, at a cylinder temperature of 310° C. and a chill roll temperature of 20° C., to obtain a cast film having a thickness of 50 μm. The amount of transfer to copper foil of the obtained film was evaluated. The results are presented in Table 1c.

Comparative Example 1c

A film was produced in the same manner as in Example 1c using a 4-methyl-1-pentene-based polymer (TPX MX004 manufactured by Mitsui Chemicals Co., Ltd.), and the amount of transfer to copper foil was evaluated. The results are presented in Table 1c.

The method for sample preparation and the methods for properties measurement used in the Examples and the Comparative Examples are as follows.

[Melt Flow Rate]
The melt flow rate was measured according to ASTM D1238 under a load of 5.0 kg at a temperature of 260° C.

[Amount of Transfer to Copper Foil]
A piece of film having a size of 30 cm×21 cm, cut from a film having a thickness of 50 μm, which was molded using a film cast molding machine equipped with a T-die at a cylinder temperature of 310° C. and a chill roll temperature of 20° C., and a sheet of copper foil were superposed. The assembly was interposed between two sheets of mirror finished metal plates, and was hot pressed at 170° C. under a load of 5 MPa for 90 minutes. Then, the copper foil was peeled off from the film, and then the surface of the copper foil adhered to the TPX film was wiped with acetone. The concentrate obtained from an extracting solution of the wiped product was taken as the amount of transfer to copper film.

TABLE 1

| | Unit | Example 1c | Comp. Ex. 1c |
|---|---|---|---|
| Amount of transfer to copper foil | mg/10 sheets | 0.1 or less | 6.0 |

Example 2c

[Production of Non-Woven Fabric]
To the polymer obtained in Example 2a, a neutralizing agent and a phenolic antioxidant, that are conventionally known, were added and mixed in a Henschel mixer. The mixture was melt kneaded using an extruder at 290° C. to obtain pellets. The melt flow rate of the obtained pellets was 180 g/10 min.

Thereafter, the pellets were subjected to spinning through a spinneret of a known spun-bonding equipment described in JP-A-2002-317372, at a rate of 1.1 g/min per nozzle. The spinnability was good until a spinning rate of 6000 m/min, and the fineness was 1.5 d (denier). The spinnability evaluation results are presented in Table 2c.

Comparative Example 2c

The spinning was carried out in the same manner as in Example 2c using a 4-methyl-1-pentene-based polymer (TPX DX820 manufactured by Mitsui Chemicals Co., Ltd.). The spinnability was good until a spinning rate of 5000 m/min, and the fineness was 2.0 d(denier). The spinnability evaluation results are presented in Table 2c.

[Melt Flow Rate]
The melt flow rate was measured according to ASTM D1238 under a load of 5.0 kg at a temperature of 260° C.

[Spinnability]
During the process of melt spinning, the presence or absence of yarn breaking was examined to evaluate the spinnability of a non-woven fabric by the following criteria.
○: No yarn breaking after 5 minutes
X: Yarn breaking occurring after 5 minutes

[Fineness]
The obtained non-woven fabric was observed with an optical microscope, and arbitrary 30 pieces of fiber were selected from the observed images. The diameters of the fiber pieces were measured, and the average value thereof was taken as the fineness.

TABLE 2

| Spinning rate (m/min) | Example 2c | Comparative Example 2c |
|---|---|---|
| 4,000 | ○ | ○ |
| 5,000 | ○ | ○ |
| 6,000 | ○ | X |

Example 3c

The copolymer of 4-methyl-1-pentene and ethylene obtained in Example 6b was subjected to hot press molding to produce a sheet having a thickness of 2 mm. Further, a specimen having a size of 10 mm×40 mm necessary for the measurement of dynamic viscoelasticity was cut out therefrom. Using RDS II manufactured by Rheometrics, Inc., the temperature dependency of the dynamic viscoelasticity was measured at a temperature range from −80 to 100° C. at a frequency of 1.6 Hz, so as to measure the peak temperature for the loss tangent (tan δ) and the tangent value that are attributable to the glass transition temperature. The value obtained at a peak temperature of 15° C. was 2.55. The results are presented in Table 3c.

Examples 4c to 5c

The copolymers of 4-methyl-1-pentene and propylene obtained in Example 7b and Example 8b were subjected to the same measurement as in Example 3c. The results are presented in Table 3c.

Comparative Example 3c

The copolymer of 4-methyl-1-pentene and 1-decene obtained in Comparative Example 3b was subjected to the same measurement as in Example 3c. The results are presented in Table 3c.

TABLE 3

|  | Example 3c | Example 4c | Example 5c | Comp. Ex. 3c |
|---|---|---|---|---|
| Peak temperature [° C.] | 15 | 20 | 23 | 26 |
| Tan δ | 2.55 | 2.17 | 3.58 | 0.33 |

INDUSTRIAL APPLICABILITY

The olefin-based polymers according to the invention are industrially highly valuable as materials having excellent thermal resistance, optical properties, electrical properties and mechanical properties. The peel-off films formed from the olefin-based polymers of the invention have narrow distributions of the co-monomer composition, and thus have less transferring matter to copper foil upon heating and pressurization. Also, in the production of printed wire boards, particularly multilayer flexible wire boards, the peel-off films do not show the phenomenon of unsettled plating due to copper foil transferring matter, and can be suitably used.

The non-woven fabrics formed from the olefin-based polymers of the invention are formed from the olefin-based polymers having narrow molecular weight distributions, and thus, the spinning rate can be increased, with the productivity of non-woven fabrics being excellent. Since the distribution of the olefin-based polymer compositions are narrow, most of the solvent-soluble components disappear. Thus, when the non-woven fabrics are used as liquid filter, the non-woven fabrics do not show the phenomenon such that the solvent-soluble components elute into liquid and can be suitably used. Further, the olefin-based polymers according to the invention have large tan δ values near room temperature, and are useful as damping materials.

The invention claimed is:

1. A 4-methyl-1-pentene-based polymer comprising 50 to 100% by weight of a constituent unit derived from 4-methyl-1-pentene, and 0 to 50% by weight of a constituent unit derived from at least one olefin selected from olefins having 2 to 20 carbon atoms except 4-methyl-1-pentene, and having the following properties:
   i) the diad isotacticity is 70% or greater;
   ii) the ratio (Mw/Mn) of the weight average molecular weight (Mw) to the number average molecular weight (Mn) as measured by gel permeation chromatography (GPC) is in the range of 1.0 to 3.5; and
   iii) the intrinsic viscosity [η] is 1.2 (dl/g) or greater.

2. A 4-methyl-1-pentene-based copolymer comprising 50 to 99.9% by weight of a constituent unit derived from 4-methyl-1-pentene, and 0.1 to 50% by weight of a constituent unit derived from at least one olefin selected from olefins having 2 to 20 carbon atoms except 4-methyl-1-pentene, and having the following properties:
   i) the diad isotacticity is 70% or greater;
   ii) the ratio (Mw/Mn) of the weight average molecular weight (Mw) to the number average molecular weight (Mn) as measured by gel permeation chromatography (GPC) is in the range of 1.0 to 3.5; and
   iii) the intrinsic viscosity [η] is 1.2 (dl/g) or greater.

3. An olefin-based polymer A comprising 90 to 100% by weight of a constituent unit derived from 4-methyl-1-pentene, and 0 to 10% by weight of a constituent unit derived from at least one olefin selected from olefins having 2 to 20 carbon atoms except 4-methyl-1-pentene, and having the following properties:
   i) the diad isotacticity is 70% or greater;
   ii) the melting point (Tm) measured by DSC is 225° C. or higher;
   iii) the ratio (Mw/Mn) of the weight average molecular weight (Mw) to the number average molecular weight (Mn) as measured by gel permeation chromatography (GPC) is in the range of 1.0 to 3.5; and
   iv) the proportion of the decane-soluble fraction is 1% by weight or less.

4. An olefin-based polymer B comprising 50 to 99% by weight of a constituent unit derived from 4-methyl-1-pentene, and 1 to 50% by weight of a constituent unit derived from at least one olefin selected from olefins having 2 to 20 carbon atoms except 4-methyl-1-pentene, and having the following properties:
   i) the diad isotacticity is 70% or greater;
   ii) the melting point (Tm) measured by DSC is below 220° C. or unrecognizable;
   iii) the ratio (Mw/Mn) of the weight average molecular weight (Mw) to the number average molecular weight (Mn) as measured by gel permeation chromatography (GPC) is in the range of 1.0 to 3.5; and
   iv) the intrinsic viscosity [η] is 1.5 (dl/g) or greater.

5. A 4-methyl-1-pentene homopolymer having the following properties:

i) the diad isotacticity is 70% or greater;

ii) the melting point (Tm) measured by DSC is 230° C. or higher;

iii) the ratio (Mw/Mn) of the weight average molecular weight (Mw) to the number average molecular weight (Mn) as measured by gel permeation chromatography (GPC) is in the range of 1.0 to 3.5; and iv) the intrinsic viscosity [η] is 1.2 (dl/g) or greater.

6. A 4-methyl-1-pentene-based elastomer comprising 50 to 90% by weight of a constituent unit derived from 4-methyl-1-pentene, and 10 to 50% by weight of a constituent unit derived from at least one olefin selected from olefins having 2 to 20 carbon atoms except 4-methyl-1-pentene, and having the following properties:

i) the diad isotacticity is 70% or greater;

ii) the ratio (Mw/Mn) of the weight average molecular weight (Mw) to the number average molecular weight (Mn) as measured by gel permeation chromatography (GPC) is in the range of 1.0 to 3.5; and iii) the intrinsic viscosity [η] is 1.2 (dl/g) or greater.

7. A method for preparing the polymer or elastomer according to claim 1, comprising reacting the 4-methyl-1-pentene and the olefin, if present, in the presence of a metallocene catalyst represented by the following Formula (1) or Formula (2):

[Chemical Formula 1]

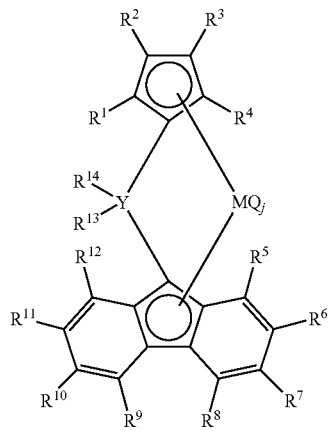

(1)

[Chemical Formula 2]

-continued

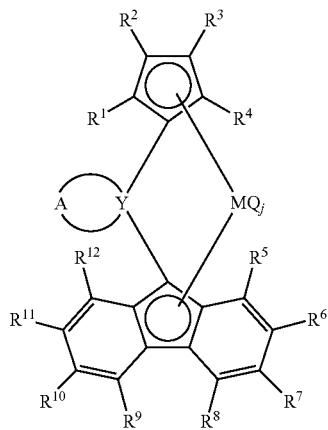

(2)

wherein $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$, which may be identical or different, are each selected from hydrogen, a hydrocarbon group and a silicon-containing hydrocarbon group; the neighboring substituents from $R^1$ to $R^4$ may be bound to each other to form a ring, and the neighboring substituents from $R^5$ to $R^{12}$ may be bound to each other to form a ring; A is a divalent hydrocarbon group having 2 to 20 carbon atoms, which may contain some unsaturated bonds and/or aromatic rings, and A may contain two or more cyclic structures including the ring formed by A together with Y; M is a metal selected from Group 4 of the Periodic Table of Elements; Y is carbon or silicon; Q is selected from halogen, a hydrocarbon group, an anionic ligand, and a neutral ligand which is capable of coordination with an electron lone pair and may be of identical or different combination; and j is an integer from 1 to 4.

8. An injection molded article comprising the polymer or elastomer according to claim 1.

9. A film or sheet comprising the polymer or elastomer according to claim 1.

10. A fiber comprising the polymer or elastomer according to claim 1.

11. A blow molded vessel comprising the polymer or elastomer according to claim 1.

12. A release film comprising the polymer or elastomer according to claim 1.

13. A non-woven fabric comprising the polymer or elastomer according to claim 1.

14. A damping material comprising the polymer or elastomer according to claim 1.

* * * * *